United States Patent
Watanabe et al.

(10) Patent No.: US 9,804,583 B2
(45) Date of Patent: Oct. 31, 2017

(54) NUMERICAL CONTROL DEVICE

(71) Applicant: FANUC Corporation, Minamitsuru-gun, Yamanashi (JP)

(72) Inventors: Mitsunori Watanabe, Minamitsuru-gun (JP); Takenori Ono, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 253 days.

(21) Appl. No.: 14/837,262

(22) Filed: Aug. 27, 2015

(65) Prior Publication Data

US 2016/0062338 A1 Mar. 3, 2016

(30) Foreign Application Priority Data

Aug. 28, 2014 (JP) ................. 2014-173767

(51) Int. Cl.
*G05B 19/19* (2006.01)
*G05B 19/416* (2006.01)

(52) U.S. Cl.
CPC ........... *G05B 19/19* (2013.01); *G05B 19/416* (2013.01); *G05B 2219/34179* (2013.01); *G05B 2219/41408* (2013.01)

(58) Field of Classification Search
CPC ...... G05B 19/18; G05B 19/19; G05B 19/416; G05B 2219/34179; G05B 2219/41408
See application file for complete search history.

(56) References Cited

U.S. PATENT DOCUMENTS

| 4,554,497 | A | 11/1985 | Nozawa et al. | |
|---|---|---|---|---|
| 2003/0216822 | A1 | 11/2003 | Sato | |
| 2008/0180045 | A1* | 7/2008 | Sladek | G05B 19/416 318/270 |
| 2009/0102411 | A1* | 4/2009 | Miller | G05B 19/416 318/573 |
| 2013/0197688 | A1* | 8/2013 | Egi | G05B 19/416 700/180 |

FOREIGN PATENT DOCUMENTS

| JP | S59-62909 A | 4/1984 |
|---|---|---|
| JP | 2003-334740 A | 11/2003 |
| JP | 2009-187521 A | 8/2009 |

OTHER PUBLICATIONS

Notification of Reasons for Refusal dated Sep. 6, 2016 in Japanese Patent Application No. 2014-173767 (2 pages) with an English Translation (2 pages).

* cited by examiner

*Primary Examiner* — Dennis M Butler
(74) *Attorney, Agent, or Firm* — Drinker Biddle & Reath LLP

(57) ABSTRACT

A numerical control device includes a command analysis unit, an acceleration calculation unit in reversing operation, a velocity control unit, and an interpolation unit. The acceleration calculation unit in reversing operation is configured to calculate the acceleration of the drive shaft before and after the reversing operation when reversal of the commanded path of the drive shaft based on the commanded data is detected by the velocity control unit.

2 Claims, 6 Drawing Sheets

FIG. 3A
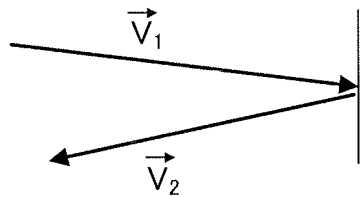
FIG. 3B
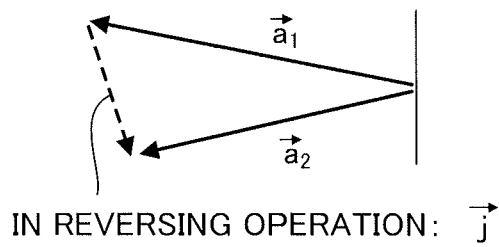
IN REVERSING OPERATION: $\vec{j}$
FIG. 3C
$$\vec{j} = \vec{a}_2 - \vec{a}_1$$
$$= \frac{a_1}{|\vec{V}_1|}\vec{V}_1 + \frac{a_2}{|\vec{V}_2|}\vec{V}_2$$
$$= a_1\vec{e}_1 + a_2\vec{e}_2$$

COMMANDED PATH WITH OBLIQUE REVERSAL

ACCELERATION IS DETERMINED
UNDER RESTRAINT CONDITION

- - - - (a1) WITH ACCELERATION AND DECELERATION IN PREDETERMINED TIME

.......... (a2) ACCELERATION IS EQUAL TO 0 IN REVERSING OPERATION

──── (a3) WITH APPROPRIATELY DECIDED ACCELERATION IN REVERSING OPERATION

COMMANDED PATH WITH 180-DEGREE REVERSAL

COMMAND POSITION

MAXIMUM ACCELERATION VALUE CAN BE DESIGNATED FOR 180-DEGREE REVERSAL (b1) WITH ACCELERATION AND DECELERATION IN PREDETERMINED TIME (b2) ACCELERATION IS EQUAL TO 0 IN REVERSING OPERATION (b3) WITH IMPROVED VELOCITY CONTROL IN REVERSING OPERATION

NUMERICAL CONTROL DEVICE

RELATED APPLICATION DATA

This application claims priority under 35 U.S.C. §119 and/or §365 to Japanese Application No. 2014-173767 filed Aug. 28, 2014, the entire contents is incorporated herein by reference.

BACKGROUND OF THE INVENTION

1. Field of the Invention

The present invention relates to a numerical control device, and particularly to the numerical control device for calculating optimum acceleration in reverse operation.

2. Description of the Related Art

In velocity control of a feed shaft of a machining tool, instant output of velocity signal commanded by the program generates rapid acceleration and rapid time derivative of acceleration (hereinafter referred to as "jerk") to cause a large amount of impact and machining error for the machining tool. Japanese Patent Laid-Open No. 59-062909 discloses a technique in which acceleration and jerk is suppressed by filtering acceleration/deceleration, to avoid a great impact on the machining tool. The technique for control, described above, effectively suppress the impact on the machining tool when change of moving direction of the feed shaft generates a corner in a machining path.

The technique descried in Japanese Patent Laid-Open No. 59-062909 causes difference between the machining path commanded by the program and the machining path generated by the filtering process. The filtering of acceleration/deceleration, when change of movement direction of the feed shaft generates a reversal in the machining path as described above, brings a problem that the path does not reach a commanded reversing point. To solve the problem, the feed shaft stops and the acceleration is controlled to be 0 at the reversing point so that the path error caused by the filtering process is suppressed and deviation of arrival position is avoided.

However, there is a problem that, re-acceleration time, needed when the acceleration is set to be 0 by filtering the acceleration/deceleration, increases the cycle time.

SUMMARY OF THE INVENTION

In view of the above-described problems in the prior art techniques, a purpose of the present invention is to provide a numerical control device which enables arriving the commanded reversing point while minimizing cycle time under a command for reversing the feed shaft movement.

The numerical control device according to the present invention is configured to control a machining tool including a plurality of drive shafts based on a machining program for machining a workpiece, the numerical control device including, a command analysis unit configured to output command data, the command data commanding operation of the drive shaft based on the machining program, an acceleration calculation unit in reversing operation, configured to calculate acceleration of the drive shaft before and after the reversing operation such that the time derivative of the acceleration is within a jerk limit, when a direction of the commanded path of the drive shaft based on the command data output by the command analysis unit is reversed, a velocity control unit configured to calculate a velocity of the drive shaft at each interpolation cycle based on the command data output by the command analysis unit and the acceleration of the drive shaft before and after the reversing operation calculated by the acceleration calculation unit in reversing operation; and, an interpolation unit configured to execute interpolation process for calculating interpolation data based on the command data output by the command analysis unit and the velocity of the drive shaft calculated by the velocity control unit, the interpolation data designating the position of the drive shaft on a moving path at each interpolation cycle, wherein, the acceleration calculation unit in reversing operation is configured to calculate the acceleration of the drive shaft before and after the reversing operation when reversal of the commanded path of the drive shaft based on the commanded data is detected by the velocity control unit.

The acceleration calculation unit in reversing operation may calculate the acceleration of the drive shaft before and after the reversing operation, as a maximum acceleration value satisfying the following equation for all shafts to be controlled.

$$|\alpha_1 e_{1[i]} + \alpha_2 e_{2[i]}| \leq j_{max[i]}$$

$e_{1[i]}, e_{2[i]}$: each axis component of unit velocity vector in the direction of the commanded path before and after the returning operation $\alpha_1, \alpha_2$: magnitude of acceleration before and after the returning operation $j_{max\,[i]}$: each axis component of the jerk limit at control point The present invention, with the configuration described above, can provide a numerical control device which enables arriving the commanded reversing point while minimizing cycle time under a command for reversing the feed shaft movement.

BRIEF DESCRIPTION OF THE DRAWINGS

The above-described object, the other object, and the feature of the invention will be proved from the description of embodiments below with reference to the accompanying drawings. In these drawings:

FIGS. 3A to 3C are brief diagrams showing acceleration calculation process in reversing operation according to an embodiment of the present invention.

DETAILED DESCRIPTION OF THE PREFERRED EMBODIMENTS

Figure 1:
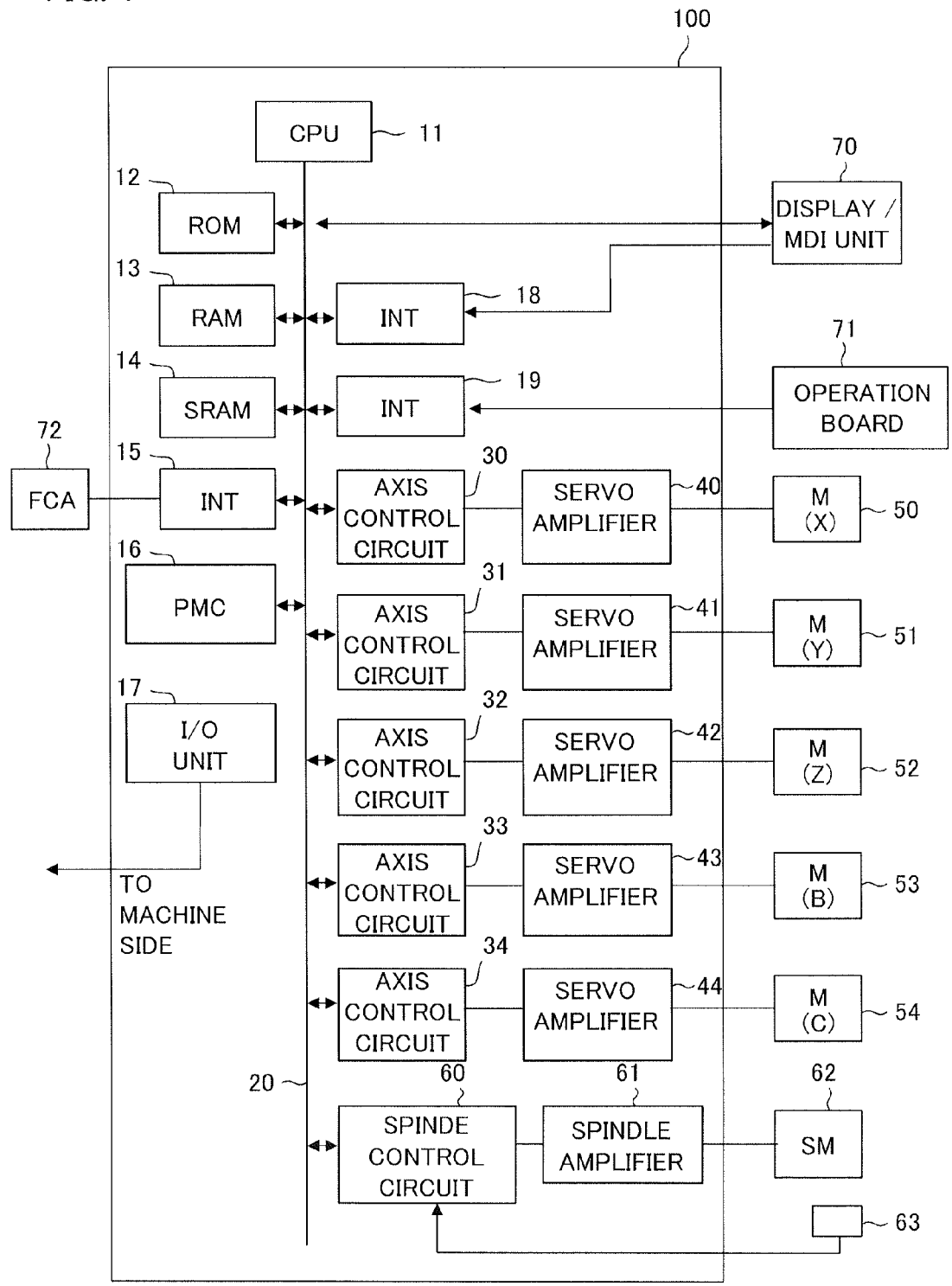
FIG. 1 is a block diagram showing a numerical control device according to an embodiment of the present invention.

FIG. 1 is a block diagram showing a numerical control device (CNC) 100 according to an embodiment of the present invention. A CPU 11 is a processor which control whole numerical control device 100. The CPU 11 reads out a system program stored in a ROM 12 via a bus 20, and controls whole numerical control device according to the system program. A RAM 13 stores temporary calculation data, display data, and various kinds of data input by an operator via a display/MDI unit 70.

A SRAM 14, backed up by a not-shown battery, is configured to be a non-volatile memory which holds a storage state even when a power source of the numerical control device 100 is turned off. The SRAM 14 stores a machining program read in via an interface 15, a machining program input via the display/MDI unit 70, and the like. Various kinds of system programs for executing process for edition mode, which is necessary for generating and editing a machining program, and process for automatic operation are written in the ROM 12, in advance.

Various kinds of machining programs, such as a machining program according to the present embodiment, are configured to be input via the interface 15 or the display/MDI unit 70, and stored in the SRAM 14.

The interface 15 enables the numerical control device 100 to be connected to an external device 72 such as an adaptor. From the external device 72 side, the machining program, various kinds of parameters are read in. The machining program, edited in the numerical control device 100, is configured to be stored in an external storage unit via the external device 72. PMC (Programmable Machine Controller) 16 issues a signal via an I/O unit 17 and controls an auxiliary apparatus, such as a robot hand for exchanging a tool, using a sequence program stored in the numerical control device 100. The PMC 16 receives a signal from various kinds of switches on the control panel installed in the main body of the machining tool or the like, and executes signal processing needed, and transfers the signal to the CPU 11.

The display/MDI unit 70 is a manual data input device, equipped with a display device, a keyboard and the like, while an interface 18 receives a command or data from the display/MDI unit 70 to transfer the command or the data to the CPU 11, and an interface 19 is connected to an operation board 71 equipped with a manual pulse generator or the like.

Axis control circuits 30 to 34 of each shaft receives a movement amount command of each shaft from the CPU 11 and outputs the command of each axis to servo amplifiers 40 to 44. The servo amplifiers 40 to 44, which receives the command, drives each servo motor 50 to 54. Each of the servo motors 50 to 54 of each shaft, which includes a position/speed detector, feeds back a position/speed feedback signal from the position/speed detector to each of the axis control circuits 30 to 34, for executing feedback control of position and speed. In the block diagram, the feedback control of position and speed is not shown.

A spindle control circuit 60 receives a spindle rotation command for the machining tool, and outputs a spindle speed signal to a spindle amplifier 61. The spindle amplifier 61, which receives the spindle speed signal, rotates a spindle motor 62 of the machining tool at commanded rotation speed and drives a tool.

A position coder 63 is coupled to the spindle motor 62, through a gear, a belt, or the like. The position coder 63 outputs a feedback pulse in synchronization with spindle rotation, and the processor 11 reads the feedback pulse via a bus 20.

Figure 2:
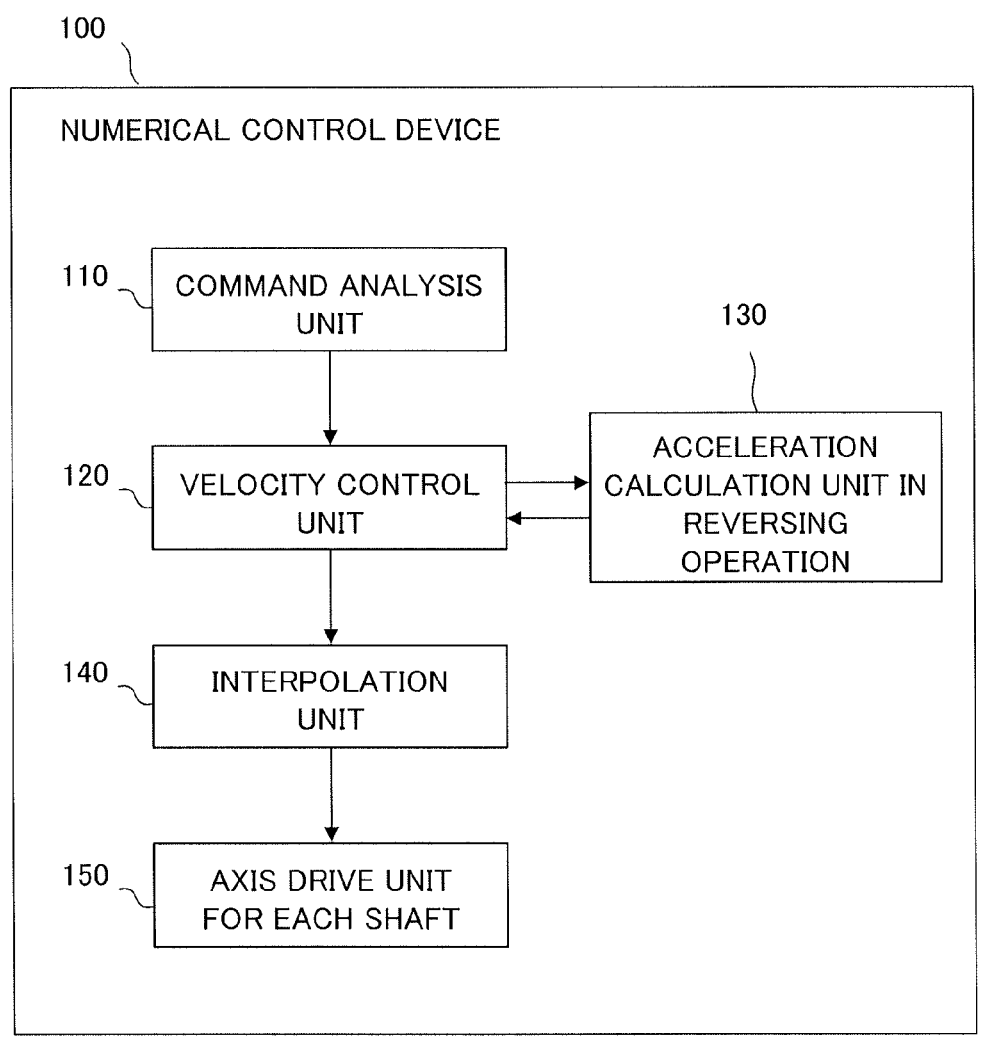
FIG. 2 is a functional block diagram showing a numerical control device according to an embodiment of the present invention.

FIG. 2 is a functional block diagram showing a numerical control device according to an embodiment of the present invention. The numerical control device 100 in the present embodiment includes a command analysis unit 100, a velocity control unit 120, an acceleration calculation unit 130 in reverse operation, an interpolation unit 140, an axis drive unit 150 for each shaft. These blocks for each function act when the CPU 11 in the numerical control device 100 executes each system program.

The command analysis unit 110 reads out the machining program from the SRAM 14, and analyzes a program command path commanded by the machining program.

The velocity control unit 120 calculates velocity, acceleration, time derivative of acceleration, and the like, for each axis, based on the program command path analyzed by the command analysis unit 110. When a path of any axis are determined to be reversed, the velocity control unit 120 issues a command for the acceleration calculation unit 130 in reverse operation, to calculate an appropriate acceleration in the reverse operation of the shaft by the acceleration calculation process in the reversing operation mentioned below, and controls the velocity based on the acceleration in the reversing operation calculated by the acceleration calculation unit 130 in reverse operation.

The interpolation unit 140 calculates movement amount per unit time of each shaft based on the velocity calculated by the velocity control unit 120. Then axis drive unit 150 for each shaft controls the servo motors and drives each shaft based on the movement amount per unit time calculated by the interpolation unit 140.

Hereinafter, the acceleration calculation process in the reversing, executed by the acceleration calculation unit 130 in reverse operation, will be described in detail. FIGS. 3A, 3B, and 3C are diagrams showing method for deriving relationship between acceleration before and after the reversing operation and the jerk limit, in acceleration calculation process in reversing operation. FIGS. 3A, 3B, 3C show moving velocity, acceleration, time derivative of acceleration at a control point by the movement command for each axis by vectors.

FIG. 3A shows the velocity vector at a control point when the commanded path is reversed, in the program command path analyzed by the command analysis unit 110. As shown in the figure, a case where the control point moves with velocity vector $\vec{V}_1$ under the command before the reversing operation, then the control point moves with velocity vector $\vec{V}_2$ under the command after the reversing operation, will be considered below.

In this case, acceleration vectors $\vec{a}_1, \vec{a}_2$ at a control point, as shown in FIG. 3B, are obtained by time-differentiating each velocity vector $\vec{V}_1, \vec{V}_2$. Here, the acceleration vectors $\vec{a}_1, \vec{a}_2$ are acceleration vectors per unit time, and the time derivative of acceleration is derived as $\vec{a}_2 - \vec{a}_1$ in the program, for example. The velocity at the reversing point is equal to 0, so the acceleration vector $\vec{a}_1$ is in the opposite direction to the velocity vector $\vec{V}_1$, that is, in the deceleration direction.

Relationship between the acceleration vectors $\vec{a}_1, \vec{a}_2$ at the control point and the time derivative vector $\vec{j}$ of the acceleration is shown in FIG. 3C. In FIG. 3C, vectors $\vec{e}_1, \vec{e}_2$ are unit velocity vectors in the command path direction before and after the reversing operation. As shown in the figure, the time derivative of acceleration $\vec{j}$ at the control point is represented using the magnitudes of the accelerations $a_1, a_2$ and the unit velocity vectors $\vec{e}_1, \vec{e}_2$ in the commanded path direction before and after the reversing operation.

Following equation (1) is derived, as a relational expression between the acceleration before and after the reversing operation and a jerk limit $\vec{j}_{max}$ at the control point, from the equation shown in the FIG. 3C.

$$|\alpha_1 e_{1[i]} + \alpha_2 e_{2[i]}| \leq j_{max[i]} \quad (1)$$

$e_{1[i]}, e_{2[i]}$: each axis component of unit velocity vector in the direction of the commanded path before and after the returning operation $\alpha_1, \alpha_2$: magnitude of acceleration before and after the returning operation $j_{max[i]}$: each axis component of the jerk limit at control point It should be noted that, the jerk limit vector $\vec{j}_{max}$ represents a limited value for the time derivative of acceleration at the control point, and may be set in a setting region of the SRAM 14 in advance as a preset value in the numerical control device 100, or may be configured to be designated in the machining program.

In the equation (1), a suffix [i] represents each axial component of the shaft to be controlled. The cycle time in the reversing control of each shaft can be minimized when the acceleration before and after the reversing operation is determined which satisfies the relational equation shown in the equation (1) derived as described above.

Figure 4:
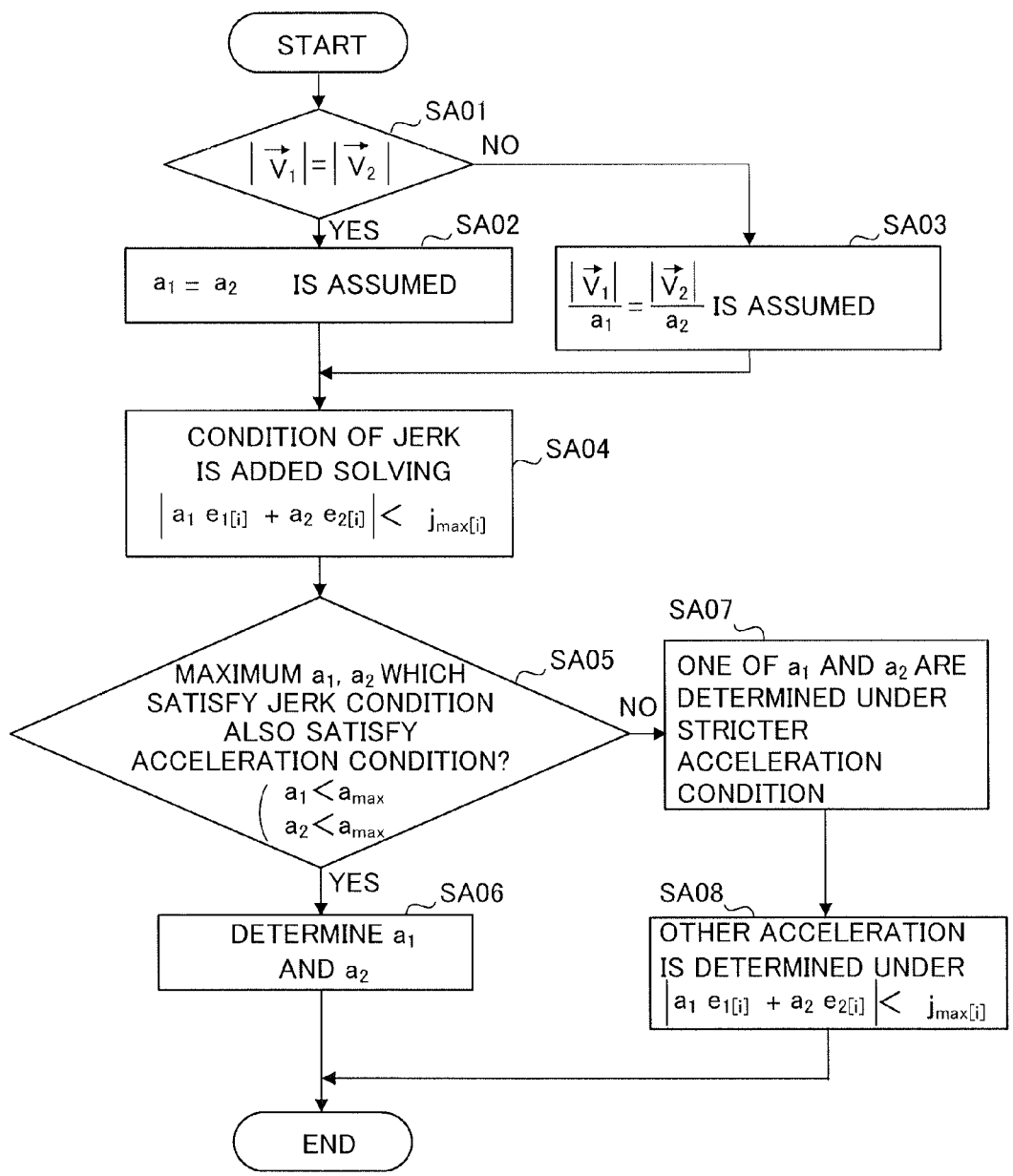
FIG. 4 is a flowchart showing acceleration calculation process in reversing operation according to an embodiment of the present invention.

FIG. 4 is a flowchart showing acceleration calculation process in reversing operation executed by the acceleration calculation unit 130 in reversing operation according to the present embodiment.

[Step SA01] It is determined whether the magnitude of the velocity vector $\vec{V}_1$ before the reversing operation is equal to the magnitude of the velocity vector $\vec{V}_2$ after the reversing operation. The process proceeds to Step SA02 if the magnitudes are equal, and proceeds to Step SA03 if not.

[Step SA02] The condition, in which the magnitude $a_1$ of the acceleration vector before the reversing operation is equal to the magnitude $a_2$ of the acceleration vector after the reversing operation, is assumed.

[Step SA03] The condition, in which the value of the magnitude of the velocity vector $\vec{V}_1$ before the reversing operation divided by the magnitude $a_1$ of the velocity vector before the reversing operation is equal to the value of the magnitude of the velocity vector $\vec{V}_2$ before the reversing operation divided by the magnitude $a_2$ of the velocity vector before the reversing operation, is assumed. The condition is based on the fact that, the cycle time is minimized when the relationship between the commanded velocity before and after the reversing operation and the acceleration before and after the reversing operation satisfies the condition describe above, except for the case where the relationship is constrained by any other condition of acceleration or the time derivative of acceleration.

[Step SA04] Condition for the time derivative of acceleration is added by solving the relationship between the magnitude $a_1$ of the velocity vector before the reversing operation and the magnitude $a_2$ of the acceleration vector after the reversing operation, based on the condition assumed in Step SA02 or Step SA03 and the relational equation shown in the equation (1).

[Step SA05] It is determined whether the maximum $a_1, a_2$, which satisfy the condition for the time derivative of acceleration derived in Step SA04, satisfy the condition for the acceleration, that $a_1$ is less than $a_{max}$, and $a_2$ is less than $a_{max}$, or not. Here, the $a_{max}$ is a limit value for acceleration at the control point, and the value may be set in the setting region of the SRAM 14 as a preset value in the numerical control device 100, or may be configured to be designated in the machining program. It should be noted that, the determination is executed for both condition for the magnitude of the time derivative of acceleration and each axis components. The process proceeds to the Step SA06 if it is determined that the condition for the acceleration is satisfied, and proceeds to Step SA07 if not.

[Step SA06] The acceleration before and after the reversing operation is determined to be $a_1$, $a_2$ obtained in Step SA05.

[Step SA07] In the condition for the acceleration, used in the determination in Step SA05, the value in the stricter condition for the acceleration is set for the limit acceleration. In the present embodiment, among the $a_1$ and $a_2$, the one which has larger excess to the limit acceleration value $a_{max}$, is determined to be the value in the stricter condition for the acceleration and set to be the limit acceleration value.

[Step SA08] The value of the acceleration set in Step SA07 is substituted to the equation (1), to determine the other acceleration.

Figure 5A:
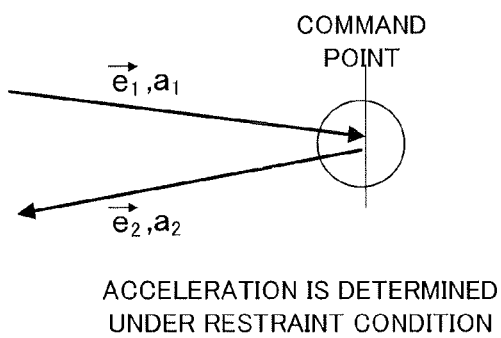
FIGS. 5A and 5B are a schematic view and a graph comparing velocity control for commanded path with oblique reversal in the present invention to those in the conventional art.
Figure 5B:
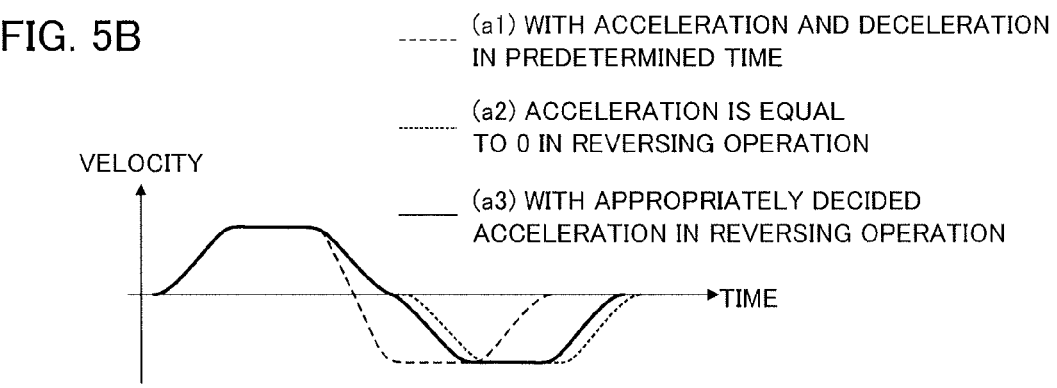

FIGS. 5A, 5B are a schematic view and a graph showing a velocity waveform in under the velocity control for the commanded path with oblique reversal in the conventional art and one in the present embodiment. In FIG. 5B, the waveform (a1) is one under acceleration/deceleration control with predetermined time in the reversing operation. In this case, the moving direction of the shaft inverts at the highest speed, but there is a problem that a large amount of impact is generated on the machining tool, and the like.

The waveform (a2) in FIG. 5B shows one in a case where the acceleration at the reversing point is equal to 0 under the acceleration control described in Japanese Patent Laid-Open No. 59-062909 and the like, and the waveform (a3) is one under the acceleration control of the present embodiment. As seen in the figures, the cycle time is reduced while the acceleration does not exceed the predetermined limit acceleration value, under the acceleration control of the present embodiment.

Figure 6A:
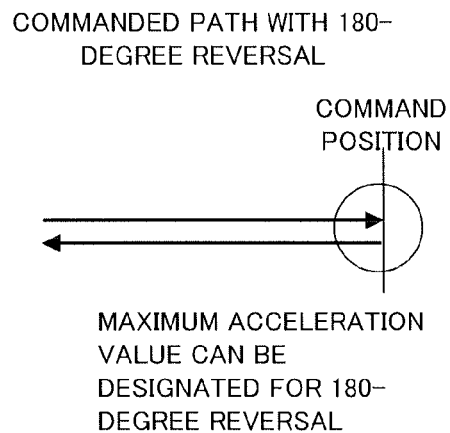
FIGS. 6A and 6B are a schematic view and a graph comparing velocity control for commanded path with 180-degree reversal in the present invention to those in the conventional art.
Figure 6B:
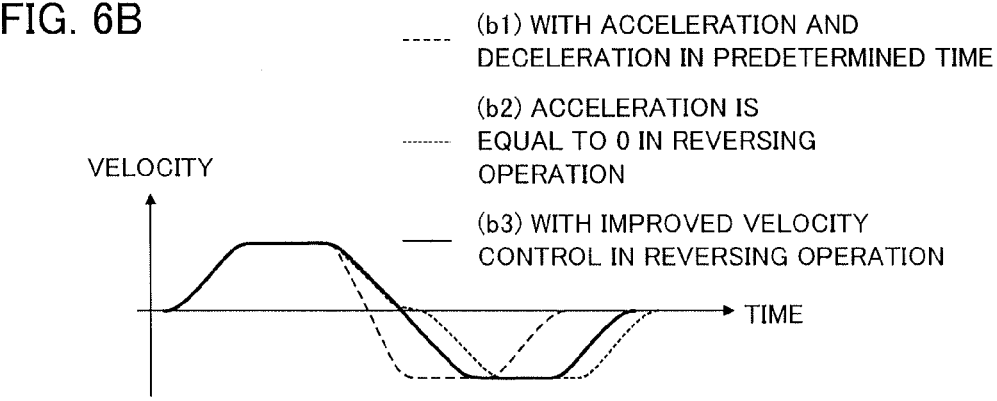

FIGS. 6A, 6B are a schematic view and a graph showing a velocity waveform in under the velocity control for the commanded path with 180-degree reversal in the conventional art and one in the present embodiment. In FIG. 6B, the waveform (b1) is one under acceleration/deceleration control with predetermined time in the reversing operation. In this case, the moving direction of the shaft inverts at the highest speed, but there is a problem that a large amount of impact is generated on the machining tool, and the like.

The waveform (b2) in FIG. 6B shows one in a case where the acceleration at the reversing point is equal to 0 under the acceleration control described in Japanese Patent Laid-Open No. 59-062909 and the like, and the waveform (b3) is one under the acceleration control of the present embodiment. As seen in the figures, the cycle time is reduced while the acceleration does not exceed the predetermined limit acceleration value, under the acceleration control of the present embodiment.

The invention claimed is:

1. A numerical control device configured to control a machining tool including a plurality of drive shafts based on a machining program for machining a workpiece, the numerical control device comprising:
    a command analysis unit configured to output command data, the command data commanding operation of the drive shaft based on the machining program;
    an acceleration calculation unit in reversing operation, configured to calculate acceleration of the drive shaft before and after the reversing operation such that the time derivative of the acceleration is within a jerk limit, when a direction of the commanded path of the drive shaft based on the command data output by the command analysis unit is reversed;

a velocity control unit configured to calculate a velocity of the drive shaft at each interpolation cycle based on the command data output by the command analysis unit and the acceleration of the drive shaft before and after the reversing operation calculated by the acceleration calculation unit in reversing operation; and an interpolation unit configured to execute interpolation process for calculating interpolation data based on the command data output by the command analysis unit and the velocity of the drive shaft calculated by the velocity control unit, the interpolation data designating the position of the drive shaft on a moving path at each interpolation cycle; wherein, the acceleration calculation unit in reversing operation is configured to calculate the acceleration of the drive shaft before and after the reversing operation when reversal of the commanded path of the drive shaft based on the commanded data is detected by the velocity control unit.

2. A numerical control device according to claim 1, wherein the acceleration calculation unit in reversing operation is configured to calculate the acceleration of the drive shaft before and after the reversing operation, as a maximum acceleration value satisfying the following equation for all shafts to be controlled $$|\alpha_1 e_{1[i]} + \alpha_2 e_{2[i]}| < j_{max[i]}$$

$e_{1[i]}, e_{2[i]}$: each axis component of unit velocity vector in the direction of the commanded path before and after the returning operation $\alpha_1, \alpha_2$: magnitude of acceleration before and after the returning operation $j_{max\ [i]}$: each axis component of the jerk limit at control point.

* * * * *